United States Patent [19]

Neefe

[11] 4,307,046
[45] Dec. 22, 1981

[54] METHOD OF LASER MACHINING CONTACT LENSES

[76] Inventor: Charles W. Neefe, P.O. Box 429, Big Spring, Tex. 79720

[21] Appl. No.: 139,194

[22] Filed: Apr. 11, 1980

Related U.S. Application Data

[63] Continuation-in-part of Ser. No. 58,027, Jul. 16, 1979, Pat. No. 4,229,390, which is a continuation-in-part of Ser. No. 5,598, Jan. 22, 1979, Pat. No. 4,188,353, which is a continuation-in-part of Ser. No. 874,934, Feb. 3, 1978, Pat. No. 4,150,073, which is a continuation-in-part of Ser. No. 793,388, May 25, 1977, abandoned.

[51] Int. Cl.³ .............................................. B29D 11/00
[52] U.S. Cl. ................. 264/1.4; 219/121 LF; 219/121 LM; 219/121 LN; 264/2.5; 264/2.7; 331/DIG. 1; 351/177
[58] Field of Search ....................... 264/1, 25, 1.4, 2.7, 264/2.5; 219/121 LN, 121 LJ, 121 LF, 121 LM, 121 L; 331/DIG. 1; 351/177; 51/284 R, 284 E; 408/701

[56] References Cited

U.S. PATENT DOCUMENTS

| 3,538,298 | 11/1970 | Duxton et al. | 219/121 LJ |
| 3,571,555 | 3/1971 | Tonnes | 219/121 LN |
| 3,700,850 | 10/1972 | Lumley et al. | 219/121 LJ |
| 3,749,878 | 7/1973 | Sullivan et al. | 331/DIG. 1 |
| 4,155,962 | 5/1979 | Neefe | 264/1 |

FOREIGN PATENT DOCUMENTS

| 838816 | 4/1970 | Canada | 219/121 L |
| 2804479 | 5/1979 | Fed. Rep. of Germany | 219/121 LM |

*Primary Examiner*—James B. Lowe

[57] ABSTRACT

A method of cutting spherical, aspheric and toric optical surfaces by rotating the lens around the optical axis and moving a cutting device on a X and Y axis to produce the desired lens shape. The energy provided by an infrared laser may be used for simultaneous machining and polishing the optical surface.

10 Claims, 4 Drawing Figures

METHOD OF LASER MACHINING CONTACT LENSES

This is a continuation-in-part of application Ser. No. 58,027 filed July 16, 1979 entitled: A METHOD OF MAKING CAST ASPHERIC LENSES, now U.S. Pat. No. 4,229,390, which is a continuation-in-part of application Ser. No. 5,598 filed Jan. 22, 1979 entitled: A METHOD OF MAKING ASPHERIC LENSES now U.S. Pat. No. 4,188,353 which is a continuation-in-part of Ser. No. 874,934, filed Feb. 3, 1978, now U.S. Pat. No. 4,150,073, which is a continuation-in-part of Ser. No. 793,388, filed May 25, 1977, now abandoned.

PRIOR ART

The use of plastic materials for making optical lenses has increased rapidly for the past ten years. This is due to the availability of better plastic materials and the physical advantages of the plastic resins for specific applications such as contact lenses. The technology for the production of high quality plastic lenses has not kept pace with the material supply industry. It is important to advance both areas if the full potential is to be realized.

Plastic lenses offer many advantages over glass lenses for eye glasses. They are much lighter in weight and resist breakage. The cost of making high quality lenses has been high due to the problems caused by the shrinkage of the monomer when polymerized, which often breaks the expensive molds.

Carbon dioxide lasers have been used to provide small holes in contact lenses. The intense heat of the focused laser beam burns smooth holes through the lenses to improve tear circulation.

STATE OF THE ART

The current lens molds are fabricated from steel or glass, each mold is individually ground and polished to the required specifications. To achieve accurate reproduction of the bifocal and toric molds is most difficult and expensive.

An object is to provide a process for making inexpensive molds which may be made to identical specifications.

Another object is to provide a process whereby standard masters may be used to produce a large quantity of replica molds.

The replica mold also serves as a holding fixture during the cutting and polishing of the second optical surface.

Another object is to provide a rapid method of cutting the convex surface using a high energy laser beam.

THE LENSES ARE MADE AS FOLLOWS

A master positive mold is made from glass or stainless steel or other materials which will withstand the molding temperatures.

Figure 1:
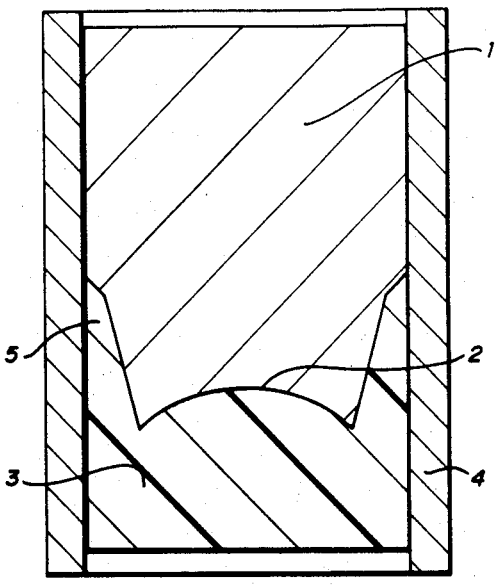
FIG. 1 shows the sleeve, steel mold and resinous mold material.

The master mold, 1 FIG. 1, is placed in a sleeve, 4 FIG. 1, a molding grade of resinous material such as polyimide, polycarbonate, polymethylpentene, polyethylene, polypropylene, nylon, or other molding material is placed in the sleeve, 4 FIG. 1. The sleeve and it's contents are heated to the softening point of the molding material, pressure is applied to form the lens mold, 3 FIG. 1. The sides of the master mold, 1 FIG. 1, have been cut to a smaller diameter to provide the opening, 5 FIG. 1. When sufficient heat and pressure have been applied, the molding compound, 3, will fill the area around the positive mold, 1, forming a cup-like cavity with a curved optical surface, 2 FIG. 1, at the bottom. Either injection or compression molding may be used to produce the lens molding container. The lens container, 3 FIG. 1, is removed from the molding sleeve, 4 FIG. 1, and the optical mold, 1 FIG. 1, is also removed.

CASTING THE CONCAVE OPTICAL SURFACE

Figure 2:
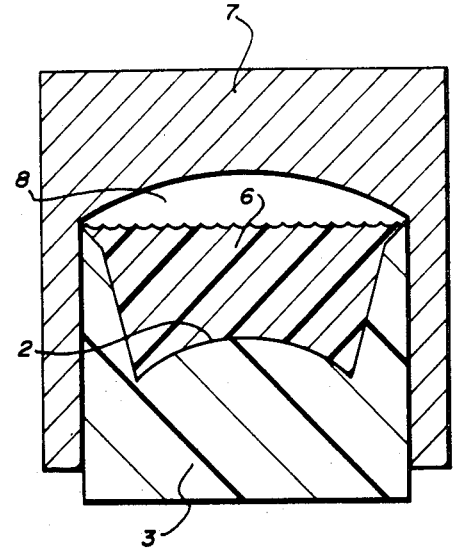
FIG. 2 shows the resinous mold containing the liquid lens monomer with the cover in place.

A liquid or syrup monomer material containing a suitable catalyst, 6 FIG. 2, is placed over the optical surface, 2 FIG. 2, and covered to prevent evaporation with a cover, 7 FIG. 2, and air space, 8 FIG. 2, is provided. The liquid monomer is polymerized to form a solid. Microwave energy or heat may be used to speed the polymerization process. Thermosetting and cross-linked materials may be used to produce lenses which are dimensionally stable. This process is suitable for the production of soft contact lenses which cannot be made by compression or injection molding techniques.

CUTTING THE SECOND OPTICAL SURFACE

Figure 3:
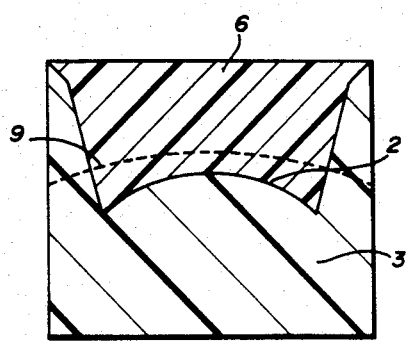
FIG. 3 shows the polymerized lens material with a optical surface molded on the resinous mold.

It is not necessary to remove the hardened plastic lens material, 6 FIG. 3, from the mold, 3 FIG. 3, before cutting the convex curve, 9 FIG. 3.

The convex lens surface may be produced by the use of a cutting device mounted on a X and Y axis movement sliding bearings. The movement of the two slides are at 90° to each other. One movement being across the lens diameter and the second movement being toward and away from the lens. The exact control of the position of each movement of the cutter and a memory of the location of the cutter can be accomplished by electromatic control unit often referred to as a computer. Spherical, aspheric and toric surfaces may be cut by electronic control. The lens is rotated around the intended optical axis. The speed of the rotation may be from 10 revolutions per minute for toric surfaces to as high as 30,000 revolutions per minute. Air turbines or conventional motors may be used to rotate the lens about the optical axis. If high speeds are to be used, air supported bearings should be selected. The cutter mounted on the X and Y axis controlled device may be a conventional diamond lens cutter or a sharply focused laser beam. The energy from a carbon dioxide laser is in the longer infrared wave-length of the optical spectrum and has proven suitable for cutting contact lens plastic materials. The cutting is accomplished by rapidly heating the material exposed to the surface of the focused beam and vaporizing the material at the surface of the coherent energy beam. The underlying material is only slightly heated as the heat is carried away by the expansion of the heated solid material transforming and expanding into a gas state. The resulting solid surface is highly polished and requires no further polishing or processing.

Figure 4:
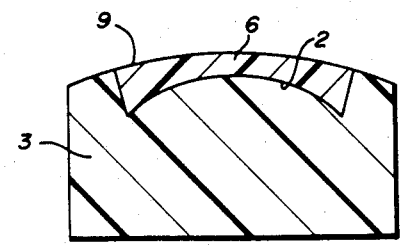
FIG. 4 shows the lens with the second optical surface cut and polished by a laser beam.

The finished lens, 6 FIG. 4, having the molded concave surface, 2, and the convex curvature, 9, which was cut and polished by laser energy without being removed from the disposable mold, 3 FIG. 4. The cup-like device has served as a container for the monomer, 6 FIG. 2, provided the molded optical surface which for contact lens production may be two or more segments providing the required optical zone, peripheral curves and lens diameter. The cup-like mold, 3 FIG. 3, also serves as the holding block to facilitate cutting the required thickness. The thickness of the cup bottom may be measured before adding the liquid monomer and measurements may be taken before the laser cutting operation and the lens thickness determined by subtracting the thickness of the cup bottom. After the lens is processed to the required specifications, the lens is removed by sharply flexing the holding fixture, 3 FIG. 4, separating the finished lens from it's support.

Various modifications can be made without departing from the spirit of this invention or the scope of the appended claims. The constants set forth in the disclosure are given as examples and are in no way final or binding. In view of the above, it will be seen that the several objects of the invention are achieved and other advantages are obtained. As many changes could be made in the above construction and method without departing from the scope of the invention, it is intended that all matter contained in the above description shall be interpreted as illustrative and not in a limiting sense.

I claim:

1. A method of making plastic lenses comprising the steps of; providing a positive lens mold having a first optical surface curvature, and a second surface corresponding to the edge surface of the finished lens with the second surface extending from the first surface curvature a distance greater than the height of the thickness of the lens, forming a negative mold from the positive mold by applying a heat softened resinous material against the first surface curvature and the second surface of the positive mold to form an open top cylinder from the resinous material with an image of the first optical surface curvature as the bottom of the cylinder and the image of the second surface as the walls of the cylinder, removing the positive lens mold from the negative lens mold, filling the resinous negative mold with a liquid monomer lens material, allowing the liquid monomer lens material to polymerize to form a solid monolithic mass within the resinous negative mold having one finished optical surface molded by the optical surface curvature formed in the bottom of the resinous mold, rotating the resinous mold and the lens material around the optical axis of the lens, moving a focused beam of infrared laser produced energy across the lens in a curved path equal to the required convex lens curvature, the focused infrared beam having sufficient energy to vaporize the lens material at the surface of the energy beam thereby removing sufficient lens material to form an optical surface on the polymerized lens material while the lens material is supported within the resinous mold adjacent to the lens material, and removing the lens from the resinous cylinder of the negative mold.

2. A method as in claim 1 wherein the focused beam of laser produced energy is moved in two controlled directions each said controlled direction being removed from the other by an angle of 90°.

3. A method as in claim 1 wherein the movement of the focused beam of laser produced energy is controlled with the rotation of the lens around the optical axis to produce a toric surface.

4. A method as in claim 1 wherein the movement of the focused laser produced beam produces a spherical convex surface on the lens.

5. A method as in claim 1 wherein the movement of the focused laser produced beam produces an aspheric convex surface.

6. A method of making plastic lenses comprising the steps of; rotating the resinous lens blank around the optical axis of the lens, moving a focused beam of infrared laser produced energy across the lens in a curved path equal to the required convex lens curvature, the focused laser beam having sufficient energy to vaporize the lens material at the surface of the energy beam thereby removing sufficient lens material to form an polished optical surface on the polymerized lens blank.

7. A method as in claim 6 wherein the focused beam of laser produced energy is moved in two controlled directions each said controlled direction being removed from the other by an angle of 90°.

8. A method as in claim 6 wherein the movement of the focused beam of laser produced energy is controlled with the rotation of the lens around the optical axis to produce a toric surface.

9. A method as in claim 6 wherein the movement of the focused laser produced beam produces a spherical convex surface on the lens.

10. A method as in claim 6 wherein the movement of the focused laser produced beam produces an aspheric convex surface.

* * * * *